United States Patent [19]
Moss et al.

[11] Patent Number: 5,049,340
[45] Date of Patent: Sep. 17, 1991

[54] PROCESS FOR MAKING CONTINUOUS FILMS OF ORDERED POLY(ETHER KETONE KETONES)

[75] Inventors: Arthur Z. Moss; George J. Ostapchenko, both of Wilmington, Del.

[73] Assignee: E. I. du Pont de Nemours and Company, Wilmington, Del.

[21] Appl. No.: 452,143

[22] Filed: Dec. 18, 1989

[51] Int. Cl.$^5$ .................. B29C 41/26; B29D 7/00
[52] U.S. Cl. .................. 264/216; 264/237; 264/331.21; 528/176; 528/194; 528/206; 528/271
[58] Field of Search .............. 264/216, 237, 331.12, 264/331.21, 331.11; 528/176, 194, 206, 271

[56] References Cited

U.S. PATENT DOCUMENTS

| | | | |
|---|---|---|---|
| 3,42,857 | 5/1969 | Thornton | 528/176 X |
| 2,936,492 | 5/1960 | Swerlick et al. | 264/216 |
| 3,065,205 | 11/1962 | Bonner, Jr. | 528/176 X |
| 3,441,538 | 4/1969 | Marks | 528/176 X |
| 3,516,966 | 6/1970 | Berr | 528/194 |
| 3,637,592 | 1/1972 | Berr | 528/194 |
| 4,687,615 | 8/1987 | Kondo et al. | 264/557 |
| 4,816,556 | 3/1989 | Gay et al. | 528/176 |

FOREIGN PATENT DOCUMENTS 1340710 12/1973 United Kingdom .

OTHER PUBLICATIONS

Chung, C. I. et al., "Design of Coat-Hanger Type Extrusion Die for Isothermal Power Law Fluids", Proceedings of the 33rd Annual SPE Technical Conference (May 1975), pp. 363-365.

Vergnes, B. et al., "Non-Isothermal Flow of a Molten Polymer in a Coat-Hanger Die", Polymer and Engineering Science, vol. 24, No. 12 (Aug. 1984), pp. 980-987.

Abstract of United Kingdom Reference 2,079,867 (Jan. 1982).

Abstract of Japanese Reference (Kokai) 63-92,430 (Oct. 1988).

Abstract of Japanese Reference (Kokai) 63-256,422 (Oct. 1988).

Primary Examiner—Leo B. Tentoni
Attorney, Agent, or Firm—Paul R. Steyermark

[57] ABSTRACT

A process for extruding a smooth and uniform film or sheet of an ordered poly(ether ketone ketone) having a thickness of about 2.5 to 250 micrometers, wherein the molten extrudate is quenched on a drum maintained at a temperature of about 100°–170° C.

19 Claims, 1 Drawing Sheet

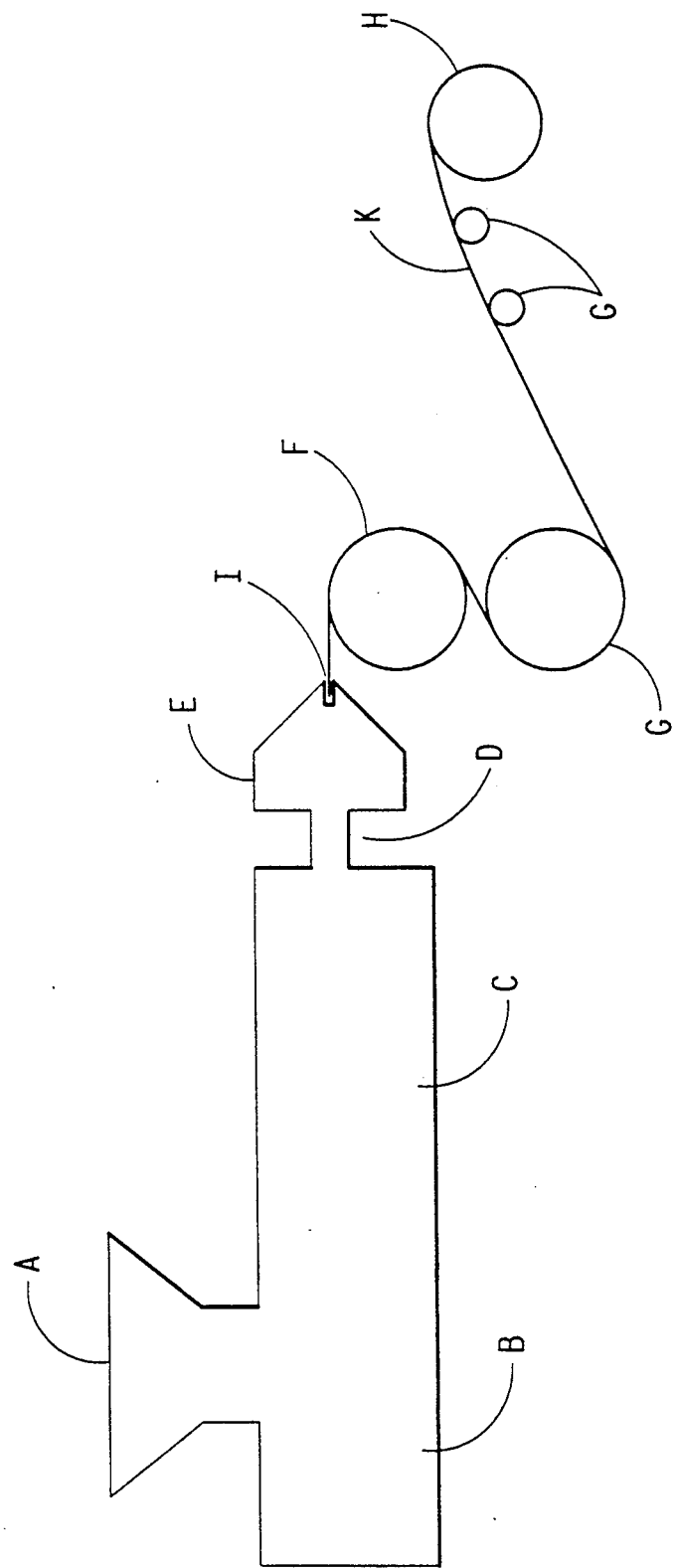

PROCESS FOR MAKING CONTINUOUS FILMS OF ORDERED POLY(ETHER KETONE KETONES)

BACKGROUND OF THE INVENTION

This invention relates to a process for making strong, tough, high gloss, transparent, uniform, substantially amorphous films from ordered poly(ether ketone ketones) sometimes referred to hereinafter as PEKKs.

PEKKs are well known and are described, i.a., in U.S. Pat. No. 3,065,205 (Bonner); U.S. Pat. No. 3,441,538, (Marks), U.S. Pat. No. 3,442,857 (Thornton), and U.S. Pat. No. 3,516,966 (Berr). PEKK films and a melt-casting process for making PEKK films are described in detail in U.S. Pat. No. 3,637,592 (Berr) and British Patent 1,340,710 (Angelo).

The PEKK principally employed in melt-casting films according to the above art was a copolymer of terephthalyl chloride (T), isophthalyl chloride (I), and diphenyl ether (DPE). The polymer, made by a one-step process was characterized by an essentially random distribution of the T and I groups along the chain backbone.

More recently, U.S. Pat. No. 4,816,556 (Gay et al.) described a two-step ynthesis of PEKK resin characterized by an ordered (nonrandom) distribution of T and I groups along the chain backbone. In these PEKKs, the T and I groups either alternate or are in blocks, and the resins are described as ordered polyetherketones. The first step in that process is an oligomerization step in which either only the T or only the I comonomer react: with DPE to form an oligomeric structure -DPE-T-DPE- or -DPE-I-DPE-. In the second step, this oligomeric intermediate is contacted with further T and I to form the final product. These ordered PEKKs have a higher heat of fusion, a smaller difference between the melting temperature and the temperature of onset of crystallization, and a melting temperature greater than the melting temperature of PEKKs having the same gross composition wherein the repeat units occur in random sequence. These ordered PEKKs are more suitable in manufacturing lecause of their better melt processing characteristics than their random counterparts.

Both Berr (U.S. Pat. No. 3,637,592) and Angelo (British Patent 1,340,710) describe a process for making films from random PEKK by continuous extrusion and melt casting of PEKK resin onto a quench (or, casting) drum. In order to obtain amorphous film, both Berr and Angelo consider it necessary to cool the casting drum to or below room temperature.

However, when a thin film of ordered PEKK resin of Gay et al. is cast onto a drum cooled to below about 100° C., especially below 80° C., it buckles and cannot be laid down smoothly upon the drum, this effect being more severe at progressively lower temperatures. Yet, smooth lay-down is required for producing uniform film. In the absence of smooth lay-down, ridges, large bumps, and waviness occur in the film. In addition to its other shortcomings, the three-dimensional character of the resulting film renders wind-up of a good quality film package or roll virtually impossible in ordinary film winding equipment.

It, therefore is desirable to provide a process for melt casting ordered PEKK resins into a smooth, essentially two-dimensional, high quality film or sheet.

SUMMARY OF THE INVENTION

According to the present invention, there is now provided a continuous process for melt casting a high quality film or sheet having a thickness of about 2.5 to 250 micrometers from an ordered poly(ether ketone ketone) resin consisting essentially of two repeating units (a) and (b) represented by the following formulas

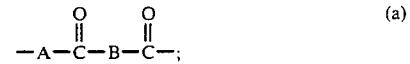

and

where A is the p,p' -Ph-O-Ph- group, and Ph stands for the phenylene radical;
B is p-phenylene and
D is m-phenylene
where the (a) and (b) units occur at a ratio in the range of 80:20 to 25:75;
said resin having an inherent viscosity at 30° C., determined for a 0.5 g/100 ml solution in concentrated sulfuric acid of about 0.6–1.2;
said process comrising the consecutive stages of melt-extruding te resin at a temperature of at most 400° C. at a die pressure of at least 1.4 MPa, directing the molten extrudate onto the surface of a rotating quench drum maintained at a temperature between 100° and 170° C. so that the resin forms a thin layer thereon, maintaining the molten resin layer in contact with the surface of the quench drum until the resin solidifies into a film or sheet, and removing the film or sheet from the quench drum.

DESCRIPTION OF THE DRAWING

The drawing is a schematic representation of an arrangement of an extrudar, a quench drum, and a take-up reel which can be used in the process of the present invention.

DETAILED DESCRIPTION OF THE INVENTION

The PEKK resins to which this invention is applicable are the same as those claimed in the above-cited U.S. Pat. No. 4,816,556 (Gay et al.). They are, according to that patent, made by a sequential reaction of diphenyl ether with terephthalyl chloride and isophthalyl chloride. The repeating units obtained by reaction with terephtalyl chloride are represented by the formula (a), above, while those obtained by reaction with isophthalyl chloride are represented by the formula (b). The ratio of (a) units to (b) units is, therefore, normally referred to as the T/I ratio. Because those groups have the same molecular weights and differ only by their substitution positions, their mole ratios and weight ratios are the same. The preferred T/I ratio is 70:30 to 25:75.

It is essential to the success of the process of this invention that the surface of the quench drum be maintained above about 100° C. Below that temperature, and especially below about 80° C., all the undesirable effects of buckling, ridge formation, and waviness occur to a greater or lesser degree. The preferred quench drum temperature is about 110°–160° C.

In the practice of this invention, the PEKK resin in the form of powder, flakes, or preferably pellets is fed to a conventional plastics extruder, either single or twin screw, wherein the resin is thoroughly melted and conveyed to a film extrusion die wherefrom it is extruded onto the quench drum and thence conveyed by a series of guides to a wind-up.

It is known in the art that inherent viscosities (I.V.), or dilute solution viscosities, can be used for determining the relative molecular weights of polymers which are similar in composition. The inherent viscosities are determined from the equation:

$$I.V. = \ln[\eta 1(\text{solution})/\eta 2(\text{solvent})]$$

where the viscosities, $\eta 1$ and $\eta 2$ are determined as described above in the Summary of the Invention. The preferred PEKK inherent viscosities are within the range of 0.7 to 1.1, especially 0.8–1.0.

At the lower end of the broadest viscosity range, it may be difficult to generate enough die pressure to fill the die uniformly and obtain stable flow. Thus, both the machine direction and transverse direction thickness control often are difficult to achieve, while substantial edge weave and build-up and slough-off from the die edges may be encountered. At the high end of the broadest viscosity range, mechanical working of the melt may result in melt temperatures in excess of 90° C., where some degradation may occur.

The resin should be thoroughly devolatilized, preferably by extraction under vacuum during extrusion, prior to film casting. This is accomplished preferably in a separate pelletization step but may also be accomplished in the film extruder if the film extruder is provided with a vacuum extraction port for removing volatile contaminants from molten resin. The devolatilized resin should then be maintained in a low-moisture environment, or dried thoroughly before film processing. Drying at 120° C. for 16 hours has proved to be effective for reducing the moisture to acceptable levels for film fabrication, e.g., 300 ppm or less.

In some circumstances, it is desirable to begin the extrusion under so-called "starve-feed" conditions, and then to inrrease the feed rate until the condition of "flood-feed" is attained. "Flood-feed" represents the highest degree of throughput consistent with a given extruder screw design and speed. It has also been found that excellent feeding is obtained when the compression ratio of screw flight depth in the feed zone to that ratio in the compression/metering zone is less than about 3.5.

Further, the temperature in the feed throat should not exceed about 200° C. to avoid clumping of the feed.

The drawing shows schematically a typical suitable arrangement for the practice of the present invention, wherein a single screw extruder is used. In the drawing, A is the feed hopper; B is the feed zone; C is the compression/metering zone; D is the adapter; E is the die; I are the die lips; F is the quench drum; G are the guides; and H is the wind-up device.

The die pressure, measured by a probe placed at or near the point of entry of the melt into the die, must be maintained at a suitably high level to cause the polymer to fill the die uniformly. The prefered die pressure is at least about 2.8 MPa, especially at least about 4.2 MPa. Die pressure varies inversely with die lip opening, directly with extruder screw speed (under flood feed conditions), and directly with resin melt viscosity. The usual die lip opening is about 100–500 micrometers.

The temperatures of the extruder barrel and die should be set in a manner consistent with obtaining a uniformly flowing melt, without causing polymer degradation. Melt temperatures preferably should be kept below 390° C., especially below 380° C.

For ordered PEKK resins having a T/I ratio of 70:30, the extruder temperatures are preferably in the range of 340°–370° C., especially 350°–370° C.; for ordered PEKK resins having a T/I ratio of 60:40, the extruder temperatures are preferably 310°–370° C., and especially 330°–360° C. When working with a resin which has an inherent viscosity near the lower end of the range suitable for the practice of this invention, it is particularly preferred to operate at temperatures close to the low end of the appropriate temperature range in order to maximize melt viscosity and thereby die pressure.

The films of ordered PEKK resins produced by the process of this invention preferably have a thickness of about 10 to 125 micrometers.

Those films are readily obtained by drawing down in the melt from die lips preset at a separation of about 250 micrometers. Little orientation, as indicated by tensile properties, appears to result from the melt draw-down.

For resins at the low end of the acceptable range of inherent viscosities, when a film of a thickness of 2.5–125 micrometers is desired, it is preferable to adjust the die lip opening to less than 250 micrometers, e.g. to 200 micrometers, in order to achieve satisfactory die pressures.

The film exiting from the film die usually is brought into contact with the quench drum as quickly as possible. The distance between the lips of the die and the quench drum preferably is 2.5 cm or less, and in general, the closer the better consistent with safety.

The cast film can be maintained in contact with the quench drum by any suitable technique. For example, electrostatic pinning across the full width of the cast film provides good lay-down, but may create a matrix of fine dots on the surface of the film. Such matrix of fine dots sometimes is considered useful because it increases the slippage of the film, thus facilitating film handling. It is believed to be caused by an interaction of unknown origin between the elctrostatic pinner and residual polymerization solvent (normally, o-dichlorobenzene). Use of an air pinner has been found to be less effective. Casting may also be performed into a nip, usually consisting of two highly polished chrome rolls or one chrome and one rubber roll, in either case the rolls being separated by the desired thickness of the film.

These films are useful in a wide variety of applications such as packaging, particularly as a component of so-called microwave susceptors, as a preferred film substrate in the production of continuous fiber composites, wherein the film is melt-bonded to a layer of fibrous material, as a component layer of laminates to enhance solvent resistance or thermal properties of other resins, as a substrate or adhesive in flexible printed circuit boards, and as a capacitor dielectric.

These amorphous films of ordered PEKKs are quite similar or superior in properties to the amorphous films of random PEKKs described by Berr and by Angelo, yet, surprisingly, cannot be made by practicing the art of Berr or of Angelo. The ordered PEKK resin, however, has processing advantages over random PEKK resin, as discussed above. Ordered PEKKs, like random PEKKs, must be processed at melt temperatures above 300° C. at the point of extrusion from the film die lips. In a typical industrial film quench configuration, the high temperature melt comes into contact with the quench drum within less than one second from the time it is extruded, imparting a substantial quantity of heat to the drum. To achieve a quench drum temperature within the range of the present invention, it is practical to employ a circulating hot oil bath to supplement the transfer of heat from the molten polymer. This is contrary to the prior art practice with random PEKK resins, which required cooling of the quench drum. To the extent that the prior art processes required refrigeration in order to bring the drum temperature to the desired low level, the process of the present invention is less cumbersome and more energy-efficient.

It is known in the art of making thick sheets of PEKK resins, having a thickness of at least about 625 micrometers, that very significant processability differences exist among such resins having different T/I ratios. A particularly large difference in processability of such resins is noted between those having T/I ratios of 60:40 and 70:30, the former being melt processable over a much wider range of conditions and, therefore, being highly preferred in this art.

It is, therefore surprising that the excellent results obtained according to the present invention do not significantly depend on the PEKK resin's T/I ratio, and especially so for the resins having respective T/I ratios of 70:30 and 60:40. It is particularly surprising that both types of ordered PEKK resins having 70:30 and 60:40 T/I ratios have the same critical minimum quench drum temperature below which good quality film cannot be made. Such a minimum quench drum temperature unexpectedly is found for thin films and sheets but not for thick PEKK resin sheets.

This result is of great practical utility because it makes a wide range of PEKK resin compositions equally available for applications for which each is best suited. For example, 70:30 T/I PEKK resin film is preferred for applications requiring higher temperature resistance or post-casting annealing to achieve, for example, higher strength and stiffness, such as certain fiber-reinforced composites. On the other hand, the 60:40 T/I PEKK resin film is preferred for applications in which its lower melting temperature is advantageous, e.g., in certain other fiber-reinforced composite structures, or where greater toughness is required.

It is to be noted that the preferred quench drum temperature range for the practice of this invention is independent of the inherent viscosity of ordered PEKK over the range of acceptable inherent viscosities, although the minimum drum temperature at which the process becomes operable will increase somewhat with increasing inherent viscosity.

Quench drum temperature will preferably lie within the range of 110°–160° C., especially 120°–150° C.

This invention is now illustrated by representative examples of certain preferred embodiments thereof, wherein all parts, proportions, and percentages are by weight unless otherwise indicated.

All the PEKK resins were made according to the teachings of the Gay at al. patent. Their properties were determined according to the following ASTM procedures:

Tensile strength, tensile modulus, tensile elongation: ASTM D-882
Tear Strength (Elmendorf): ASTM D-1922
Impact Strength (Spencer): A8TM D-3420
Fold Endurance (MIT): ASTM D-2176
Impact Strength (Pneumatic Ball Impact): ASTM D-3099

All the units not originally measured or obtained according to SI have been converted to SI units. The abbreviation MD/TD means machine direction/transverse direction.

In Examples 1–9, film was fabricated using a Werner & Pfleiderer 28 mm twin screw extruder equipped with a 25 cm vertical coathanger die manufactured by Extrusion Dies Incorporated. The die lip opening was preset at 250 micrometers. It is to be noted, however, that the die lip opening is normally adjusted during the running to create a transverse lip opening profile which compensates for minor flow differences in the die in order to produce a film of uniform thickness. A screenpack consisting of 841-177-99-841 micrometer screens or, alternatively, 841-177-149-841 micrometer screens was placed, except where noted, between the extruder and the die. A polished, chrome-plated quench drum was employed. The drum was heated or cooled, as required, by continuously circulating oil pumped by an external pump through a heat exchanger. The line speed was in the range of 7.5–9.8 m/min. An electrostatic pinner was employed to maintain uniform film/drum contact.

EXAMPLE 1

The PEKK T/I ratio was 70:30 and its inherent viscosity 0.77. No screen pack was employed. The finished film thickness was about 38 micrometers; the drum temperature was 122° C., the melt temperature 362° C., and the die pressure 1.4 MPa.

EXAMPLE 2

In Example 2 and in Comparative Example 1, the T/I ratio of the PEKK resin was 70:30; the inherent viscosity was 0.78.

The drum temperature was 163° C., the melt temperature 355° C.; the die pressure was 2.8 MPa; the film thickness was 32 micrometers. Film was flat on drum, exhibiting high gloss, and good uniformity in appearance. No crystallinity was found by examination of the cast film using wide angle x-ray diffraction method. Properties of the film, as cast, are shown in Table I.

TABLE I

| | |
|---|---|
| Thickness (micrometers) | 32 |
| Tensile Strength MD/TD (MPa) | 89.6/84.8 |
| Tensile Modulus MD/TD (MPa) | 2530/2592 |
| Elongation MD/TD (%) | 170/150 |
| Elmendorf Tear (g/mm) | 1457/2362 |
| Spencer Impact (J) | 0.19 |
| MIT Fold (Cycles) | 4250 |
| Pneumatic Ball Impact (J) | 0.18 |

COMPARATIVE EXAMPLE 1

The drum temperature was 60° C., the minimum temperature attainable in this configuration; the circulating oil was at 35° C. The melt temperature was about 358° C.; the die pressure was 3 MPa; the film thickness was 33 micrometers. The film was forming bumps and ripples, and was no longer in perfect contact with the drum surface. No crystallinity was found by examination of the film as cast using wide angle x-ray diffraction. Properties of the cast film are shown in Table II.

TABLE II

| | |
|---|---|
| I.V. | 0.78 |
| Thickness (micrometers) | 32.3 |
| Tensile Strength MD/TD (MPa) | 97.2/84.1 |
| Tensile Modulus MD/TD (MPa) | 2482/2564 |
| Elongation MD/TD (%) | 172/130 |
| Elmendorf Tear (g/mm) | 2087/1693 |
| Spencer Impact (J) | 0.44 |
| MIT Fold | 4220 |
| Pneumatic Ball Impact (J) | 0.19 |

COMPARATIVE EXAMPLE 2

In Comparative Example 2 and in Example 3, the T/I ratio of the PEKK resin was 70:30 and the inherent viscosity 0.93.

The surface temperature of the drum was 63° C.; the temperature of the circulating oil was 30° C. The melt temperature was 361° C.; the die pressure was 5.5 MPa; the film thickness was about 35 micrometers. The resulting film exhibited a large number of ripples and was not laying down flat on the quench drum. The degree of rippling was significantly more severe than in Comparative Example 1.

EXAMPLE 3

This is the preferred embodiment of the present invention.

The drum temperature was 122° C.; the melt temperature was 360° C.; the die pressure was 5.4 MPa; the film thickness was 34 micrometers. The film was laying down with no apparent ripples or wrinkles. It was glossy, transparent, strong, tough and uniform. No crystallinity was found by wide angle x-ray diffraction. Properties of this film are shown in Table III.

TABLE III

| | |
|---|---|
| I.V. | 0.93 |
| Thickness (micrometers) | 32 |
| Tensile Strength MD/TD (MPa) | 149.6/131.7 |
| Tensile Modulus MD/TD (MPa) | 3399/3427 |
| Elongation MD/TD (%) | 192/165 |
| Elmendorf Tear (g/mmm) | 2047/2008 |
| Spencer Impact (J) | 0.81 |
| MIT Fold | 15550 |
| Pneumatic Ball Impact (J) | 0.25 |

COMPRATIVE EXAMPLE 3

In Comparative Example 3 and in Example 4, the T/I ratio of the PEKK resin was 60:40, and its inherent viscosity was 0:68.

Melt temperature was 343° C.; the die pressure was 1.6 MPa; the film thickness was 25–40 micrometers. The extrusion was started with the quench drum at room temperature. At that point, the film was badly ridged. As the drum warmed, the ridges decreased. At about 100°–110° C., the ridges largely disappeared.

EXAMPLE 4

The drum temperature was 125° C.; the melt temperature was 330° C.; the die pressure was 1.8 MPa; the film thickness was 33 micrometers. The film was laying down without ripples. No crystallinity was found by wide angle x-ray diffraction. Properties of the cast film are shown in Table IV.

TABLE IV

| | |
|---|---|
| I.V. | 0.68 |
| Thickness (microm) | 33 |
| Tensile Strength MD/TD (MPa) | 85.5/75.1 |
| Tensile Modulus MD/TD (MPa | 2413/2461 |
| Elongation MD/TD (%) | 175/14 |
| Elmendorf Tear (g/mil) | 1220/1220 |
| Spencer Impact (J) | 0.15 |
| MIT Fold (cycles) | 1350 |
| Pneumatic Ball Impact (J) | 0.11 |

COMPARATIVE EXAMPLE 4

In Comparative Example 4 and in Example 5, the T/I ratio was 60:40, and the inherent viscosity was 0.92.

Melt temperature was 359° C.; die pressure was 6.3 MPa; the film thickness was not determined but it was no more than 250 micrometers. The oil temperature controller was set at 140° C., and the drum temperature leveled out at 125° C. The film was smooth, laying down without ripples. The oil temperature controller was reduced to a set point of 115° C., and the quench drum leveled out at 103° C.; small ripples began to appear in the film. Oil temperature control was further reduced to 90° C. As the drum cooled, the film became badly disrupted by ripples and ridging. Temperature was increased, with the drum leveling out at 115° C.; most but not all signs of rippling disappeared. As the drum temperature was further increased to 130° C., rippling was essentially gone.

EXAMPLE 5

Drum temperature was 125° C.; melt temperature was 361° C.; die pressure was 6.0 MPa; film thickness was 35 micrometers. The film lay down smoothly and uniformly. Some haziness was noted. However, no crystallinity was found by examination of the cast film using wide angle x-ray diffraction. Properties of the cast film are given in Table V.

TABLE V

| | |
|---|---|
| I.V. | 0.93 |
| Thickness (micrometers) | 36 |
| Tensile Strength MD/TD (MPa) | 93/85 |
| Tensile Modulus MD/TD (MPa) | 2372/2358 |
| Elongation MD/TD (%) | 176/163 |
| Elmendorf Tear (g/mm) | 2835/2441 |
| Spencer Impact (J) | 0.47 |
| MIT Fold (cycles) | 5265 |
| Pneumatic Ball Impact (J) | 0.26 |

EXAMPLE 6

PEKK of a T/I ratio of 70:30 and an I.V. of 0.78 was fed to a 5.1 cm single-screw extruder manufactured by Davis Standard and was fed through a 91.4 cm-wide horizontal coat-hanger die. The quench drum was at 124° C.; the die pressure was 2.0 MPa; the film thickness was 9 micrometers. The film quality was excellent with no sign of rippling on the drum.

We claim:

1. A continuous process for casting a high quality amorphous structure selected from the group consisting of films and sheets (film or sheet) having a thickness of about 2.5 to 250 micrometers from an ordered poly(ether ketone ketone) resin consisting essentially of two repeating units (a) and (b) represented by the following formulas

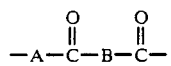

and

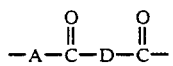

where A is the p,p'-Ph-O-Ph- group, and Ph stands for the phenylene radical;
B is p-phenylene; and
D is m-phenylene;
where the (a) and (b) units occur at a ratio in the range of 80:20 to 25:75;
said resin having an inherent viscosity at 30° C., determined for a 0.5 g/100 ml solution in concentrated sulfuric acid, or about 0.6-1.2;
said process comprising the consecutive stages of melt-extruding the resin at a temperature of at most 400° C. through a die having lips through which the extended structure exits the die at a die pressure of at least 1.4 MPa, directing the molten extrudate onto the cylindrical surface of a rotating quench drum maintained at a temperature between 100° C. and 170° C. so that the resin layer forms a thin layer thereon, maintaining the molten resin layer in contact with the surface of the quench drum until the resin solidifies into the structure (a film or sheet), and removing the structure (film or sheet) from the quench drum.

2. A process of claim 1 wherein the die lip opening is about 100-500 micrometers.

3. A process of claim 2 wherein the lip opening of the die is at most 250 micrometers (or less), and the thickness of the structure (film or sheet) produced thereby is at most 125 micrometers (or less).

4. A process of claim 1 wherein the resin has an inherent viscosity of about 0.7-1.1.

5. A process of claim 4 wherein the resin has an inherent viscosity of about 0.8-1.

6. A process of claim 1 wherein the temperature of the melt in the extruder is at most 390° C.

7. A process of claim 6 wherein the temperature of the melt in the extruder is at most 380° C.

8. A process of claim 7 wherein the poly(ether ketone ketone) resin has diphenyl ether groups, terephthalyl groups, and isophthalyl groups, and where the ratio of terephthalyl to isophthalyl isomer is about 70:30.

9. A process of claim 8 wherein the temperature of the melt in the extruder is about 340°-360° C.

10. A process of claim 9 wherein the temperature of the melt in the extruder is about 350°-360° C.

11. A process of claim 7 wherein the poly(ether ketone ketone) resin has diphenyl ether groups, terephthalyl groups, and isophthalyl groups, and where the ratio of terephthalyl to isophthalyl isomer is about 60:40.

12. A process of claim 11 wherein the temperature of the melt in the extruder is about 310°-370° C.

13. A process of claim 12 wherein the temperature of the melt in the extruder is 330°-360° C.

14. A process of claim 1 wherein the extruder die pressure is at least 2.8 MPa.

15. A process of claim 14 wherein the extruder die pressure is at least 4.2 MPa.

16. A process of claim 1 wherein the quench drum temperature is aoout 110°-160° C.

17. A process of claim 3 wherein the poly(ether ketone ketone) resin has diphenyl ether groups, terephthalyl groups, and isophthalyl groups, and where the ratio of terephthalyl to isophthalyl isomer is about 70:30.

18. A process of claim 3 wherein the poly(ether ketone ketone) resin has diphenyl ether groups, terephthalyl groups, and isophthalyl groups, and where the ratio of terephthalyl to isophthalyl isomer is about 60:40.

19. A process of claim 2 wherein the quench drum temperature is about 110°-160° C.

* * * * *

UNITED STATES PATENT AND TRADEMARK OFFICE
CERTIFICATE OF CORRECTION

PATENT NO. : 5,049,340

DATED : September 17, 1991

INVENTOR(S) : Arthur Z. Moss and George J. Ostapchenko

It is certified that error appears in the above-identified patent and that said Letters Patent is hereby corrected as shown below:

Col. 9, lines 31 and 32, please delete the parenthetical expressions.

Col. 9, lines 37, 38 and 39, please delete the parenthetical expressions.

Col. 10, line 12, change "360°C" to read --370°C--.

Signed and Sealed this

Twentieth Day of April, 1993

Attest:

MICHAEL K. KIRK

*Attesting Officer*   *Acting Commissioner of Patents and Trademarks*